United States Patent [19]
Steinberg et al.

[11] 4,055,686
[45] Oct. 25, 1977

[54] METHOD OF FORMING METAL HYDRIDE FILMS

[75] Inventors: Robert Steinberg, Berea; Donald L. Alger, Cleveland; Dale W. Cooper, Rocky River, all of Ohio

[73] Assignee: The United States of America as represented by the Administrator of the National Aeronautics and Space Administration, Washington, D.C.

[21] Appl. No.: 659,882

[22] Filed: Feb. 20, 1976

[51] Int. Cl.$^2$ .......................... G21G 4/02; G21G 3/04
[52] U.S. Cl. .................................... 427/124; 427/126; 427/255; 427/248 E; 427/250; 250/499; 313/61 S
[58] Field of Search ............... 427/250, 248 E, 248 B, 427/255, 124, 126; 250/499; 313/61 R, 61 S

[56] References Cited

U.S. PATENT DOCUMENTS

| | | | |
|---|---|---|---|
| 3,167,655 | 1/1965 | Redstone et al. | 313/61 R X |
| 3,320,422 | 5/1967 | St. John | 313/61 R X |
| 3,359,422 | 12/1967 | Pollock | 313/61 R X |
| 3,924,137 | 12/1975 | Alger | 250/499 |

*Primary Examiner*—Ralph S. Kendall
*Attorney, Agent, or Firm*—N. T. Musial; J. A. Mackin; John R. Manning

[57] ABSTRACT

There is disclosed a method of forming a continuous, thin film of stoichiometric metal hydride such as titanium dihydride, titanium dideuteride, or titanium ditritide on a substrate which may be of metal, glass or the like. The substrate is first cleaned, both chemically and by off-sputtering in a vacuum chamber. In an ultra-high vacuum system vapor deposition by a sublimator or vaporizer first coats a cooled shroud disposed around the substrate with a thin film of hydride forming metal which getters any contaminant gas molecules. A shutter is then opened to allow hydride forming metal to be deposited as a film or coating on the substrate.

After the hydride forming metal coating is formed, a deuterium or other hydrogen isotopes are bled into the vacuum system and diffused into the metal film or coating to form a hydride of metal film. Higher substrate temperatures and pressures may be used if various parameters are appropriately adjusted.

14 Claims, No Drawings

METHOD OF FORMING METAL HYDRIDE FILMS

ORIGIN OF THE INVENTION

The invention described herein was made by employees of the United States Government and may be manufactured or used by or for the Government without the payment of any royalties thereon or therefor.

BACKGROUND OF THE INVENTION

This invention relates to a process for forming a thin metal hydride film and is directed more particularly to a method of forming a titanium hydrogen isotopic film.

In general, titanium hydrogen isotopic films made with deuterium or tritium are useful as superior neutron generator targets, corrosive resistant coatings, hydrogen diffusion barriers or for hydrogen storage. Titanium films that are partly loaded with deuterium or tritium are in general used as neutron generator targets. However, such films are substantially $TiD_1$ or $TiT_1$ compounds and consist of a two-phase mixture of titanium metal and titanium dideuteride or titanium tritide. Thus, the films are not stoichiometric.

Powders compounded of $TiH_2$ and $TiD_2$ have been formed in the past but have not been successfully used to provide continuous films. The titanium hydrogen isotopic films of the prior art have been porous and brittle and have had poor electrical and thermal conductivity. These factors are generally objectionable and are particularly objectionable for neutron targets.

Metal hydride films to be useful as corrosion resistant coatings or hydrogen diffusion barriers must be free of occlusions, cracks orother discontinuities. A hydrogen diffusion barrier, by way of example, may comprise a metal hydride film on the inner surface of a metal tank. Such a film prevents any isotopes of hydrogen present in the tank from embrittling the metal which may cause destruction of the tank.

OBJECTS AND SUMMARY OF THE INVENTION

It is an object of the invention to provide a new and novel method of forming metal hydride isotopic films on substrates.

It is another object of the invention to provide a method of forming a metal hydride isotopic film which is substantially continuous, that is, free of voids and cracks.

Another object of the invention is to provide a method of applying a titanium hydrogen isotopic film to a substrate with the film being tenaciously bonded to the substrate.

Still another object of the invention is to provide a method of bonding to a substrate a continuous metal hydride isotopic film of stoichiometric composition.

Yet another object of the invention is to provide a metal hydride isotopic film which, with relationship to the substrate, has high electrical and thermal conductivity through the interface between the substrate and the film.

In summary, the invention provides a method of depositing on a substrate a stoichiometric, continuous metal hydride isotopic film using specific ranges of pressuring temperature and other conditons.

DESCRIPTION OF A PREFERRED EMBODIMENT OF THE INVENTION

Initially, a substrate and a compatible hydride forming metal to be deposited thereon are selected. Of course, if the substrate is a body to be protected by a metal hydride film, the particular metal of the film is the variable factor. On the other hand, where a titanium hydride film is desired, as for example in a neutron generator target, the substrate material will be the variable.

The metal hydride film substrate system is quite tolerant to a difference between the coefficients of expansion of the film and the substrate. This is because the film is strongly bonded to the substrate and, further, because the crystals of the film are in compression. This state of compression results from expansion of the metal crystals when they change structure as hydride forms from the hydride forming metal.

Because the crystals of the film are in compression, expansion of the substrate at a greater rate than the film simply relieves some of the compressive forces and does not cause undesirable tensile stresses in the film. Advantageously, the film has relatively great strength in that the compressive forces cause it to be prestressed prior to its use, for example, as a neutron generator target. The compression of the crystals prevails up to the decomposition temperature of the metal hydride.

The hydride forming metal is selected from the group consisting of titanium, zirconium, ytrium, scandium, lanthanon, cerium, praseodymium, neodymium, terbium, erbium and dysprosium. The substrate is preferably copper when a neutron target is being constructed but platinum or tungsten may also be utilized. Where the metal hydride is to serve as a protective coating for a substrate, the latter can be any solid material chemically and mechanically compatible with the hydride forming metal. Metal, glass and plastic can be provided with a stoichiometric metal hydride coating by the method of the instant invention. A hydrogen isotope barrier generally comprises a metal hydride film on the inside surface of a metal tank or wall.

The substrate is next mechanically and/or chemically cleaned. It is then mounted on a specimen holder in commercial ultra high vacuum chamber and further cleaned by sputter etching, preferably with parallel D.C. and radio frequency (RF) sputter etching. The sputter etching should be carried on for approximately thirty minutes or more.

The vacuum system is then pumped down to about five times $10^{-9}$ Torr and a sublimator (or vaporizer) containing the hydride forming metal to be vapor deposited on the substrate is turned on. This causes thermal evaporation of the hydride forming metal.

While the nomenclature "sublimator" is used herein, it will be understood that some of the hydride forming metals which may be used will actually vaporize at certain temperatures which may be relatively low, in some cases lower than the substrate temperature of the instant method.

The heat from the sublimator or vaporizer will cause pressure in the chamber to rise approximately four or five decades. The vapor deposition is continued until the system pressure is down to about the $10^{-9}$ Torr range. A film of hydride forming metal is now present on the inner surface of a stainless steel cooled shroud which surrounds the substrate and substrate holder. This hydride forming metal film acts as a getter for oxygen or other impurities to prevent them from being present in the film to be deposited on the substrate. To control the temperature of the shroud and the substrate, the shroud and the substrate specimen holder are provided with respective heating or cooling coils through which there are directed liquids of desired temperature. Such arrangements are well-known.

Next, a shutter disposed between a substrate and the sublimator is opened and the operation of the sublimator or vaporizer is continued. The hydride forming metal being sublimated or vaporized will now form a vapor-deposited coating on the substrate. After the desired film thickness is obtained, the sublimator or vaporizer is turned off and allowed to cool. A quartz crystal is used to monitor film thickness by well-known techniques.

To the end that the film of hydride forming metal deposited on the substrate will be covered to a continuous, stoichiometric film, an isotope of hydrogen gas is admitted to the vacuum chamber until the pressure reaches approximately $10^{-5}$ to $10^{-4}$ Torr. A palladium membrane is interposed between the hydrogen isotope gas source and the vacuum chamber to purify the gas.

The vacuum is maintained at a pressure appropriate to the selected temperature of the substrate such that the rate of deuterium diffusion into the metal film is greater than the rate of adsorption at the surface. By keeping the rate of adsorption of the hydrogen isotope gas at the surface of the film less than the rate of diffusion of the gas through the metal film, surface flaking or cracking of the film will be avoided.

While the foregoing is a general description of the method embodying the invention, specific examples will now be given.

SUBSTRATE CLEANING METHODS

EXAMPLE I

Platinum

The platinum substrate foils were cut from 99.99 percent pure platinum sheet stock by using a hand-held double bow cutting punch. By backing the thin platinum sheet with an approximately 0.635 cm thick lucite plate on a firm bench surface and striking the pumch a sharp hammer blow, clean-cut foils resulted with constant diameters and sharp edges. The following cleaning procedure was followed:

a. Swish in a beaker of clean acetone for a few minutes;
b. Rinse in an ethyl alcohol bath of an ultrasonic cleaner for about 15 minutes;
c. Etch in 10 percent HCL aqueous solution for not less than 20 minutes;
d. Rinse four times with demineralized water;
e. Clean again in ethyl (or methyl) alcohol vapor bath for about 30 minutes;
f. Rinse in demineralized water (sometimes omitted this step).
g. Air dry under an infrared heat lamp with the specimen placed on lint free paper on an inclined surface for droplet drain off;
h. During and after cleaning the specimens were handled with clean tweezers by clamping the specimen at the edge. After cleaning, the specimens were placed in clean metal "pill box" containers along with a small silica gel bag. Specimens were sandwiched between lintfree paper discs. The metal containers were sealed from atmosphere by a pressure sensitive tape;
i. Just prior to placing the foils on the substrate holder of the vacuum system, dust particles were removed by a high velocity jet of Freon 12 from a compressed gas container (EFFA duster);
j. After formation of the $TiD_x$ compound on the substrate, the specimen was returned to its metal container. The silica gel in the container served to absorb water vapor and prevented any interchange of hydrogen of atmospheric water vapor with the deuterium of the $TiD_x$ compound.

EXAMPLE II.

Corning 7059 glass preparation

1. $TiD_x$ films were applied to both smooth glass surfaces and glass surfaces that had been roughened by sand blasting with 50 micrometer diameter aluminum oxide particles. During early experiments, the $TiD_x$ films peeled from the smooth glass surfaces that were coated with a two-phase titanium/titanium deuteride film, but adhered to the roughened glass surfaces. Glass substrate surfaces were all roughened thereafter. In addition, the following cleaning procedures were used:

a. Expose to air jet to remove aluminum oxide particles;
b. Swish in acetone;
c. Clean in ultrasonic alcohol bath for at least 15 minutes;
d. Rinse with demineralized water;
e. Clean by swishing in chronic acid for a few minutes;
f. Follow steps 4 through 10 as done for platinum foil substrates.

2. An alternate cleaning procedure was sometimes used that provided successful adherence of film to substrate for some experiments. This procedure involved simply the etching of the glass substrates in a 2 percent HF acid solution followed by several demineralized water rinses and a final methanol rinse.

EXAMPLE III.

Copper target substrates

1. During early experiments, copper disc surfaces were mechanically polished with number 600 emery paper before cleaning. Some of the two-phase titanium/titanium deuteride films peeled from the smooth substrates. In later experiments, both polished discs and discs that had been roughened by sand blasting with 50 micrometer diameter aluminum oxide particles were simultaneously coated. Both kinds of discs were given the cleaning treatment outlined below. The single-phase $TiD_x$ films appeared to adhere equally well on both types of surfaces. The disc cleaning procedure used is the following:

a. Expose to air jet to remove aluminum oxide particles (roughened surface);
b. Swish in acetone;
c. Clean in ultrasonic alcohol bath for at least 15 minutes;
d. Rinse with demineralized water;
e. Dip briefly in a copper etch solution containing, by volume, approximately 53 percent methanol, 26 percent nitric acid, and 21 percent butyl cellosolve;
f. Follow steps 4 through 10 as done for platinum substrates.

2. An alternate cleaning procedure was sometimes used to clean the copper substrates with some success. The substrates were first etched for a few minutes in a 10 percent HNO₃ and 2 percent HF aqueous solution. This etch was followed by several rinses in demineralized water and a final methanol rinse.

METAL HYDRIDE FILM FORMING METHODS

EXAMPLE I

In this example a $TiD_{1.96}$ film is formed on a copper substrate to provide a neutron generator target. The substrate is first cleaned as previously described and then placed in the vacuum chamber.

The stoichiometric $TiD_2$ film formation process

1. The deuterium servo leak valve is opened to the system back to the valve at the exit of the palladium leak. Following insertion of a substrate specimen in the VI-360 system, the system is roughed by VacSorb pumps, then pumped further by the Vacion pump. The entire vacuum system is then subjected to a 250° C bake, with the VacIon pump on, for approximately 24 hours.

2. After cooling of the system, the $LN_2$ cryobaffle in the lower chamber is chilled and the system allowed to reach its ultimate pressure of approximately $5 \times 10^{-9}$ Torr.

3. System is backfilled with argon and the substrates and substrate holder sputter etch cleaned for approximately 30 minutes. VacIon is valved off from the vacuum system during the operation, but cryobaffle is chilled. Argon is then pumped from the system by VacSorb pumps to approximately $10^{-4}$ Torr. The deuterium servo leak valve is then closed so that the deuterium feed line between the palladium membrane and the palladium exit valve can be evacuated using the VacSorb pumps. After completion, the exit valve is then closed, the servo leak opened, and the VacSorb pump turned off. System is then pumped to $5 \times 10^{-9}$ Torr again by the VacIon pump and cryobaffle.

4. A shutter is interposed between the sublimator and substrates when the sublimator is turned on. Initial outgassing from the heated surfaces and the system causes the pressure to rise 4 or 5 decades. The sublimator is left on for at least 10 hours at a 0.5 g/hr sublimation rate until the system pressure again reaches the $10^{-10}$ Torr pressure range. A fresh titanium getter film now coats the inner surface of the stainless steel shroud that completely surrounds the substrate holder. The getter surface is water cooled with city water to about 9° C.

5. The sublimator is left on at approximately 0.5 g/hr rate and the shutter is opened so that titanium is deposited onto the substrates. Sublimation continues until the desired thickness of titanium is reached (as indicated by the GP quartz crystal thickness monitor). Thickness is approximately 3 micrometers after 16-18 hours of sublimation at this rate. The sublimator is then turned off and allowed to cool.

6. The deuterium servo valve is then closed and the palladium exit valve opened so that deuterium gas passes into the line between the palladium membrane and the servo leak. The VacIon is valved off from the system, but the cryobaffle is kept chilled. Deuterium gas is leaked into the system until the pressure is $10^{-5}$ Torr. The pressure controller maintains the system pressure at $1 \times 10^{-5}$ Torr during absorption of the deuterium by the titanium. The number of hours required for $TiD_2$ formation of an approximately 3 micrometers thick film is about 100 hours for the 9° C substrate temperature. After about 50 hours, another 15 minutes of sublimation was performed.

7. Films formed by the above procedure were analyzed by chemical means for titanium, oxygen, nitrogen, and total hydrogen isotope content. The films were analyzed for deuterium and hydrogen content by mass spectrometer methods. Titanium deuteride film of a composition of $TiD_{1.96}$ was formed.

EXAMPLE II

The same procedure as in Example I. was followed to form a titanium hydride film on platinum.

EXAMPLE III

The same procedure as in Example I. was followed to form a titanium hydride film on glass.

It will be understood that changes and modifications may be made to the above-described invention without departing from the spirit and scope thereof as set forth in the claims appended hereto.

What is claimed is:

1. A process for coating a substrate with a continuous, stoichiometric, metal hydride film comprising the steps of
   - selecting a substrate compatible with a hydride forming metal to be coated thereon,
   - chemically cleaning said substrate,
   - disposing said substrate in a vacuum chamber capable of being evacuated to a pressure of about $10^{-10}$ Torr, said substrate being enclosed by a shroud, a sublimator of the hydride forming metal also being disposed within said shroud with a shutter positioned between said substrate and said sublimator,
   - sputter etching said substrate,
   - evacuating said chamber to a pressure of from about $10^{-8}$ to $10^{-10}$ Torr,
   - vapor depositing said hydride forming metal on the interior of said shroud with said shutter closed to form a gettering layer of said hydride forming metal on the interior of said shroud,
   - opening said shutter to cause a film of said hydride forming metal to vapor deposit on said substrate,
   - directing a hydrogen isotopic gas into said chamber to achieve a pressure such that the gas is diffused through said hydride forming metal film at a rate substantially and continuously greater than the rate at which it is absorbed at the surface of said film thereby converting said film to a metal hydride.

2. The process of claim 1 wherein said hydride forming metal is selected from the group consisting of titanium, zirconium, yttrium, scandium, lanthanon, cerium, praseodymium, neodymium, terbium, erbium and dysprosium.

3. The process of claim 1 wherein said film is a metal having a thermal conductivity greater than 0.15 watt/cm° K.

4. The process of claim 1 wherein said hydride forming step for a titanium film is accomplished at a pressure of about $10^{-5}$ Torr with the substrate temperature at about 282° K (9° C).

5. The process of claim 4 wherein said pressure and temperature are maintained for about 100 hours for a film about 3 micrometers thick.

6. The process of claim 5 wherein said substrate is copper.

7. The process of claim 1 wherein said hydrogen isotopic gas is deuterium.

8. The process of claim 1 wherein hydrogen isotopic gas is tritium.

9. The process of claim 1 wherein said hydrogen isotopic gas is hydrogen.

10. The process of claim 1 wherein said shroud is maintained at a temperature of about 9° C during the sublimation step with the shutter closed.

11. The process of claim 1 wherein said sputter etching is continued for at least 30 minutes.

12. The process of claim 1 wherein said substrate is a metal selected from the group consisting of tungsten, copper and platinum.

13. The process of claim 1 wherein said substrate is a material selected from the group consisting of metals, plastic and glass.

14. The process of claim 1 wherein said substrate is copper and wherein said chemical cleaning includes the steps of swishing in a baker of clean acetone for a few minutes,
rinsing in an ethyl alcohol bath of an ultrasonic cleaner for about 15 minutes,
etching in 10 percent HCL aqueous solution for not less than 20 minutes,
rinsing at least four times with demineralized water,
cleaning again in ethyl (or methyl) alcohol vapor bath for about 30 minutes,
rinsing in demineralized water,
air drying under an infrared heat lamp.

* * * * *